(12) United States Patent
Chen et al.

(10) Patent No.: US 10,554,275 B2
(45) Date of Patent: Feb. 4, 2020

(54) CHANNEL STATE INFORMATION FEEDBACK METHOD, CHANNEL STATE INFORMATION ACQUISITION METHOD, CHANNEL STATE INFORMATION FEEDBACK DEVICE AND CHANNEL STATE INFORMATION ACQUISITION DEVICE

(71) Applicant: CHINA ACADEMY OF TELECOMMUNICATIONS TECHNOLOGY, Beijing (CN)

(72) Inventors: Runhua Chen, Beijing (CN); Hui Li, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 58 days.

(21) Appl. No.: 15/521,607

(22) PCT Filed: Sep. 21, 2015

(86) PCT No.: PCT/CN2015/090096
§ 371 (c)(1),
(2) Date: Apr. 24, 2017

(87) PCT Pub. No.: WO2016/062178
PCT Pub. Date: Apr. 28, 2016

(65) Prior Publication Data
US 2017/0244459 A1 Aug. 24, 2017

(30) Foreign Application Priority Data

Oct. 24, 2014 (CN) .......................... 2014 1 0575759

(51) Int. Cl.
H04B 7/06 (2006.01)
H04L 5/00 (2006.01)
H04W 88/02 (2009.01)

(52) U.S. Cl.
CPC ........... *H04B 7/0617* (2013.01); *H04B 7/063* (2013.01); *H04B 7/0626* (2013.01);
(Continued)

(58) Field of Classification Search
None
See application file for complete search history.

(56) References Cited

U.S. PATENT DOCUMENTS

2011/0170435 A1 7/2011 Kim et al.
2012/0281783 A1 11/2012 Cheng et al.
(Continued)

FOREIGN PATENT DOCUMENTS

| CN | 101877865 A | 11/2010 |
| CN | 102414999 A | 4/2012 |

(Continued)

OTHER PUBLICATIONS

"Prioritization of CSI feedback enhancement scenarios for DL-MIMO", 3GPP TSG RAN WG1 Meeting #66 R1-112515 Athens, Greece, Aug. 22-26, 2011.
(Continued)

*Primary Examiner* — Jamaal Henson
(74) *Attorney, Agent, or Firm* — Ladas & Parry, LLP (57) ABSTRACT

A CSI feedback method, a CSI acquisition method, a CSI feedback device and a CSI acquisition device are provided, so as to reduce pilot resources configured for a UE and reduce the difficulty in processing CSI progresses at a UE side, thereby to facilitate the CSI feedback and acquisition and save resources. The CSI acquisition method includes steps of: determining beamforming array information in a
(Continued)

first dimension; beamforming a pilot signal in a second dimension in accordance with the beamforming array information in the first dimension, and transmitting the beamformed pilot signal in the second dimension to a UE through a pilot resource in the second dimension; and receiving, from the UE, CSI in the second dimension obtained by measuring the pilot signal in the second dimension.

9 Claims, 5 Drawing Sheets

(52) U.S. Cl.
CPC ......... *H04B 7/0639* (2013.01); *H04L 5/0048* (2013.01); *H04L 5/0057* (2013.01); *H04W 88/02* (2013.01)

(56) References Cited

U.S. PATENT DOCUMENTS

| | | | | |
|---|---|---|---|---|
| 2013/0308715 | A1* | 11/2013 | Nam | H04B 7/0469 375/267 |
| 2013/0329664 | A1* | 12/2013 | Kim | H04W 24/10 370/329 |
| 2014/0177745 | A1* | 6/2014 | Krishnamurthy | H04B 7/0413 375/267 |
| 2014/0286182 | A1 | 9/2014 | Chen et al. | |
| 2015/0043673 | A1* | 2/2015 | Lee | H04B 7/0469 375/267 |
| 2015/0124736 | A1 | 5/2015 | Ko et al. | |
| 2016/0065290 | A1* | 3/2016 | Zhu | H04W 52/0209 370/329 |

FOREIGN PATENT DOCUMENTS

| | | | |
|---|---|---|---|
| CN | 102696183 A | 9/2012 | |
| CN | 102938688 A | 2/2013 | |
| CN | 103840868 A | 6/2014 | |
| EP | 2866358 A1 * | 4/2015 | .......... H04B 7/0626 |
| WO | 2014003384 A1 | 1/2014 | |
| WO | 2014072796 A1 | 5/2014 | |
| WO | 2014/107012 A1 | 7/2014 | |
| WO | 2014117748 A1 | 8/2014 | |

OTHER PUBLICATIONS

International Search Report for PCT/CN2015/090096, dated Dec. 21, 2015, and its English translation provided by WIPO.
Written Opinion of the International Search Authority for PCT/CN2015/090096, dated Dec. 21, 2015, and its English translation provided by Bing.Com Microsoft Translate.
International Preliminary Report on Patentability for PCT/CN2015/090096 dated Apr. 25, 2017.
"Enhancements on codebook and feedback mechanism", 3GPP TSG RAN WG1 Meeting #78bis, R1-144048, Ljubljana, Slovenia, Oct. 6-10, 2014, LG Electronics.
Alcatel-Lucent Shanghai Bell Alcatel-Lucent . Considerations on CSI feedback enhancements for high-priority antenna configurations 3GPP TSG-RAN WG1 #66 R1-112420 Aug. 26, 2011.
First Search for related Chinese Application 201210473482.3 provided by SIPO dated Jun. 17, 2016.
First Office Action and translation for related Chinese Application 201210473482.3 provided by SIPO dated Aug. 1, 2016.
Supplemental Search for related Chinese Application 201210473482.3 provided by SIPO dated Nov. 30, 2016.
Second Office Action and translation for related Chinese Application 201210473482.3 provided by SIPO dated Dec. 15, 2016.
First Search and translation for related Taiwanese Application 104132664 provided by Taiwanese Patent Office dated Aug. 22, 2016.
From EPO Application No. 15853245.7, Supplementary European Search Report and Search Opinion dated Oct. 4, 2017.

* cited by examiner

CHANNEL STATE INFORMATION FEEDBACK METHOD, CHANNEL STATE INFORMATION ACQUISITION METHOD, CHANNEL STATE INFORMATION FEEDBACK DEVICE AND CHANNEL STATE INFORMATION ACQUISITION DEVICE

CROSS-REFERENCE TO RELATED APPLICATION

The present application is the U.S. national phase of PCT/CN2015/090096 filed on Sep. 21, 2015, which claims priority to the Chinese patent application No. 201410575759.2 filed on Oct. 24, 2014, the disclosures of which are incorporated herein by reference in their entireties.

TECHNICAL FIELD

The present disclosure relates to the field of communication technology, in particular to a channel state information (CSI) feedback method, a CSI acquisition method, a CSI feedback device and a CSI acquisition device.

BACKGROUND

In a cellular system in the related art, antennae of a base station are usually arranged horizontally in an array form. Beams from a transmitter of the base station may merely be adjusted in a horizontal direction, and the each beam is provided with a fixed down-tilt angle in a vertical direction. Hence, various beamforming/precoding technologies may be performed on the basis of channel information in the horizontal direction. However, actually, a radio signal is transmitted in a space in a three-dimensional (3D) manner, so it is impossible to provide an optimal system performance through the fixed down-tilt angle.

For a 3D Multiple Input Multiple Output (MIMO) technique, one of its important features lies in that there are a large number of antennae at a base station side (a network side) and the antenna array is provided with a two-dimensional (2D) antenna structure. For example, there may exist 8, 16, 32 or 64 antennae.

Along with the development of the antenna technology, an active antenna capable of controlling each element independently has currently emerged. Through this design, in the antenna array, the antennae arranged horizontally in a 2D manner may be replaced with the antennae arranged horizontally and vertically in a 3D manner. Correspondingly, it is possible to dynamically adjust the beams in the vertical direction.

For a Frequency Division Duplexing (FDD) system, the 3D beamforming/precoding operation needs to be performed on the basis of CSI reported by a User Equipment (UE). As a possible way, the CSI may be reported on the basis of a codebook, as that adopted by a Long Term Evolution (LTE) Release 8 system.

In order to feed back the CSI using the 3D MIMO technique, in the related art, a plurality of Channel State Information Reference Signal (CSI-RS) resources may be configured for an evolved Node B (eNB) in a horizontal dimension, and pilot resources may be provided with different vertical beam-forming matrices at an eNB end. Then, the UE may measure each pilot resource in the horizontal dimension and report the CSI. Actually, in this scheme, the CSI feedback mode of a beamforming vector in the vertical dimension is combined with the CSI feedback mode in the horizontal dimension. However, there exist the following defects in this scheme.

1. There exists a very high CSI-RS resource overhead. For example, in the case that the eNB is provided with 8 beamforming vectors in the vertical dimension, 8 pilot resources need to be configured for the eNB in the horizontal direction, resulting a huge overhead for the system.

2. In order to enable eNB to acquire beam information in the vertical dimension, the UE needs to feed back signals measured on the one or more pilot resources, which results in a relatively large uplink feedback overhead.

3. The UE needs to be provided with a strong ability of processing the plurality of pilot resources in the vertical dimension (i.e., a plurality of CSI progresses), so the power consumption may increase and the UE design may be very complex, which is thus adverse to the spread of the 3D MIMO technique.

In a word, for the scheme for acquiring the CSI using the 3D MIMO technique in the related art, it is necessary to configure the pilot resources in various dimensions for the UE, resulting in a huge resource overhead. In addition, it is difficult to process the CSI progresses at a UE side, so the implementation of the scheme may be not easy.

SUMMARY (1) Technical Problem to be Solved

A consideration of the present disclosure is to provide a CSI feedback method, a CSI acquisition method, a CSI feedback device and a CSI acquisition method, so as to reduce pilot resource overhead configured for the UE and reduce the difficulty in processing the CSI feedback progresses at the UE side, thereby to facilitate the CSI feedback and acquisition and save the resources.

(2) Technical Solution

In one aspect, the present disclosure provides a CSI acquisition method implemented a network side device, including steps of: determining beamforming array information in a first dimension; beamforming a pilot signal in a second dimension in accordance with the beamforming array information in the first dimension, and transmitting the beamformed pilot signal in the second dimension to a UE through a pilot resource in the second dimension; and receiving, from the UE, CSI in the second dimension obtained by the UE by measuring the beamformed pilot signal in the second dimension.

According to the CSI acquisition method, the pilot signal in the second dimension, which needs to be transmitted through the pilot resource in the second dimension pre-configured for the UE, may be beamformed in accordance with the beamforming array information in the first dimension, and then the beamformed pilot signal in the second dimension may be transmitted to the UE through the pilot resource in the second dimension, so that the UE may measure the pilot signal in the second dimension beamformed in accordance with the beamforming array information in the first dimension and the obtained CSI is just overall CSI for a final 3D MIMO antenna array. In this way, it is unnecessary to configure excessive pilot resources for the UE, and it is unnecessary for the UE to measure and report the excessive pilot resources, thereby it is able to reduce the difficulty in processing the CSI progresses at a UE side. In addition, the network side device may directly schedule a link in accordance with the CSI in one dimension reported by the UE, rather than the CSI in two dimensions, so it is able to facilitate the CSI feedback and acquisition, and save the resources.

Optionally, the step of determining the beamforming array information in the first dimension includes: pre-configuring a pilot resource in the first dimension for the UE and notifying the UE of the pilot resource in the first dimension; transmitting a pilot signal in the first dimension to the UE through the pilot resource in the first dimension; and receiving, from the UE, CSI in the first dimension obtained by the UE by measuring the pilot signal in the first dimension through the pilot resource in the first dimension, and taking the CSI in the first dimension as the beamforming array information in the first dimension.

Optionally, the CSI in the first dimension includes Precoding Matrix Indicator (PMI) information.

Optionally, the CSI in the first dimension further includes Rank Indicator (RI) information corresponding to the PMI information.

Optionally, the CSI in the first dimension further includes Channel Quality Indicator (CQI) information obtained by the UE in accordance with the PMI information.

Optionally, the step of beamforming the pilot signal in the second dimension in accordance with the beamforming array information in the first dimension includes: beamforming the pilot signal in the second dimension through the CSI in the first dimension which is measured by the UE through the pilot resource in the first dimension and transmitted from the UE; or processing the CSI in the first dimension and beamforming the pilot signal in the second dimension in accordance with the processed CSI in the first dimension.

Optionally, the step of determining the beamforming array information in the first dimension includes measuring an uplink channel and measuring the beamforming array information in the first dimension.

Optionally, the first dimension is perpendicular to the second dimension.

Optionally, the first dimension is a vertical dimension, and the second dimension is a horizontal dimension.

Optionally, the pilot resource is a CSI-RS resource or a Common Reference Signal (CRS) resource.

In another aspect, the present disclosure provides a CSI feedback method implemented by a UE, including steps of: determining a pilot resource in a second dimension pre-configured by a network side device for the UE; measuring a beamformed pilot signal in the second dimension transmitted by the network side device through the pilot resource in the second dimension, to acquire CSI in the second dimension, where the beamformed pilot signal in the second dimension is acquired by beamforming, by the network side device, a pilot signal in the second dimension to be transmitted through the pilot resource in the second dimension in accordance with beamforming array information in a first dimension; and transmitting the CSI in the second dimension to the network side device.

According to the CSI feedback method, the network side device may beamform the pilot signal in the second dimension, which needs to be transmitted through the pilot resource in the second dimension pre-configured for the UE, in accordance with the beamforming array information in the first dimension, and then transmit the beamformed pilot signal in the second dimension to the UE through the pilot resource in the second dimension, so that the UE may measure the pilot signal in the second dimension beamformed in accordance with the beamforming array information in the first dimension and the obtained CSI is just overall CSI for a final 3D MIMO antenna array. In this way, it is unnecessary for the UE to perform measurement and reporting operations with respect to excessive pilot resources, thereby it is able to reduce the difficulty in processing the CSI progresses at a UE side, facilitate the CSI feedback and acquisition, and save the resources.

Optionally, the CSI feedback method further includes: determining, by the UE, a pilot resource in the first dimension pre-configured by the network side device for the UE: measuring a pilot signal in the first dimension transmitted through the pilot resource in the first dimension, to acquire CSI in the first dimension; and transmitting, by the UE, the CSI in the first dimension to the network side device.

Optionally, the CSI in the first dimension includes PMI information.

Optionally, the CSI in the first dimension further includes RI information corresponding to the PMI information.

Optionally, the CSI in the first dimension further includes CQI information obtained by the UE in accordance with the PMI information.

In yet another aspect, the present disclosure provides a CSI acquisition device, including: a first unit configured to determine beamforming array information in a first dimension; a second unit configured to beamform a pilot signal in a second dimension in accordance with the beamforming array information in the first dimension, and transmit the beamformed pilot signal in the second dimension to a UE through a pilot resource in the second dimension; and a third unit configured to receive from the UE CSI in the second dimension obtained by the UE by measuring the beamformed pilot signal in the second dimension.

Optionally, the CSI acquisition device further includes a fourth unit configured to pre-configure a pilot resource in the first dimension for the UE and notify the UE of the pilot resource in the first dimension, and transmit a pilot signal in the first dimension to the UE through the pilot resource in the first dimension. The first unit is further configured to receive, from the UE, CSI in the first dimension obtained by the UE by measuring the pilot signal in the first dimension on the pilot resource in the first dimension, and take the CSI in the first dimension as the beamforming array information in the first dimension.

Optionally, the CSI in the first dimension includes PMI information.

Optionally, the CSI in the first dimension further includes RI information corresponding to the PMI information.

Optionally, the CSI in the first dimension further includes CQI information obtained by the UE in accordance with the PMI information.

Optionally, in the case the second unit beamforms the pilot signal in the second dimension in accordance with the beamforming array information in the first dimension, the second unit is further configured to beamform the pilot signal in the second dimension through the CSI in the first dimension which is measured by the UE through the pilot resource in the first dimension and transmitted from the UE; or process the CSI in the first dimension and beamform the pilot signal in the second dimension in accordance with the processed CSI in the first dimension.

Optionally, the first unit is further configured to measure an uplink channel and determine the beamforming array information in the first dimension.

In still yet another aspect, the present disclosure provides a CSI feedback device, including: a pilot resource determination unit configured to determine a pilot resource in a second dimension pre-configured by a network side device for a UE; a measurement unit configured to measure a beamformed pilot signal in the second dimension transmitted by the network side device through the pilot resource in the second dimension, to acquire CSI in the second dimension, where the beamformed pilot signal in the second dimension is acquired by beamforming, by the network side device, a pilot signal in the second dimension to be transmitted through the pilot resource in the second dimension in accordance with beamforming array information in a first dimension; and a transmission unit configured to transmit the CSI in the second dimension to the network side device.

Optionally, the pilot resource determination unit is further configured to determine a pilot resource in the first dimension pre-configured by the network side device for the UE. The measurement unit is further configured to measure a pilot signal in the first dimension transmitted through the pilot resource in the first dimension, to acquire CSI in the first dimension. The transmission unit is further configured to transmit the CSI in the first dimension to the network side device.

In still yet another aspect, the present disclosure provides a network side device, including: a processor; a memory connected to the processor via a bus interface and configured to store therein programs and data for the operation of the processor; and a transceiver configured to communicate with any other devices over a transmission medium. In the case that the programs and data stored in the memory are called and executed by the processor, the network side device is configured to: determine beamforming array information in a first dimension; beamform a pilot signal in a second dimension in accordance with the beamforming array information in the first dimension, and transmit the beamformed pilot signal in the second dimension to a UE through a pilot resource in the second dimension; and receive from the UE CSI in the second dimension obtained by the UE by measuring the beamformed pilot signal in the second dimension.

In still yet another aspect, the present disclosure provides a UE, including: a processor; a memory connected to the processor via a bus interface and configured to store therein programs and data for the operation of the processor; and a transceiver configured to communicate with any other devices over a transmission medium. In the case that the programs and data stored in the memory are called and executed by the processor, the UE is configured to: determine a pilot resource in a second dimension pre-configured by a network side device for the UE; measure a beamformed pilot signal in the second dimension transmitted by the network side device through the pilot resource in the second dimension, to acquire CSI in the second dimension, where the beamformed pilot signal in the second dimension is acquired by beamforming, by the network side device, a pilot signal in the second dimension to be transmitted through the pilot resource in the second dimension in accordance with beamforming array information in a first dimension; and transmit the CSI in the second dimension to the network side device.

(3) Beneficial Effect

According to the CSI feedback method, the CSI acquisition method, the CSI feedback device and the CSI acquisition device in the present disclosure, it is able to reduce the pilot resources configured for the UE and reduce the difficulty in processing the CSI progresses at the UE side, thereby to facilitate the CSI feedback and acquisition and save the resources.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a CSI feedback method, a CSI acquisition method, a CSI feedback device and a CSI acquisition method, so as to reduce pilot resource overhead configured for a UE and reduce the difficulty in processing CSI feedback progresses at a UE side, thereby to facilitate the CSI feedback and acquisition and save the resources.

A radio signal is transmitted in a space in a 3D manner, and it is impossible to provide an optimal system performance through a fixed down-tilt angle, so beam adjustment in a vertical direction plays a very important role in reducing inter-cell interference and improving the system performance.

In the embodiments of the present disclosure, a first dimension is perpendicular to a second dimension, and a pilot resource may be, but not limited to, a CSI-RS resource or a CRS resource.

The following description will be given in the case that the first dimension is a vertical dimension, the second dimension is a horizontal dimension and the pilot resource is a CSI-RS resource, and based on this, a person skilled in the art may obtain the other embodiments through modification or alteration.

In the embodiments of the present disclosure, an eNB may configure CSI-RS resources in the vertical dimension for the UE, so as to perform measurement in the vertical dimension. In a wireless system in the related art, e.g., an LTE system, a pilot signal may be used for measuring channel information or Radio Resource Management (RRM), e.g., it may be used to measure Reference Signal Received Power (RSRP) and Reference Signal Received Quality (RSRQ). This measurement may be performed by measuring the CRS or CSI-RS, or any other pilot signals, which will not be particularly defined herein.

Figure 1:
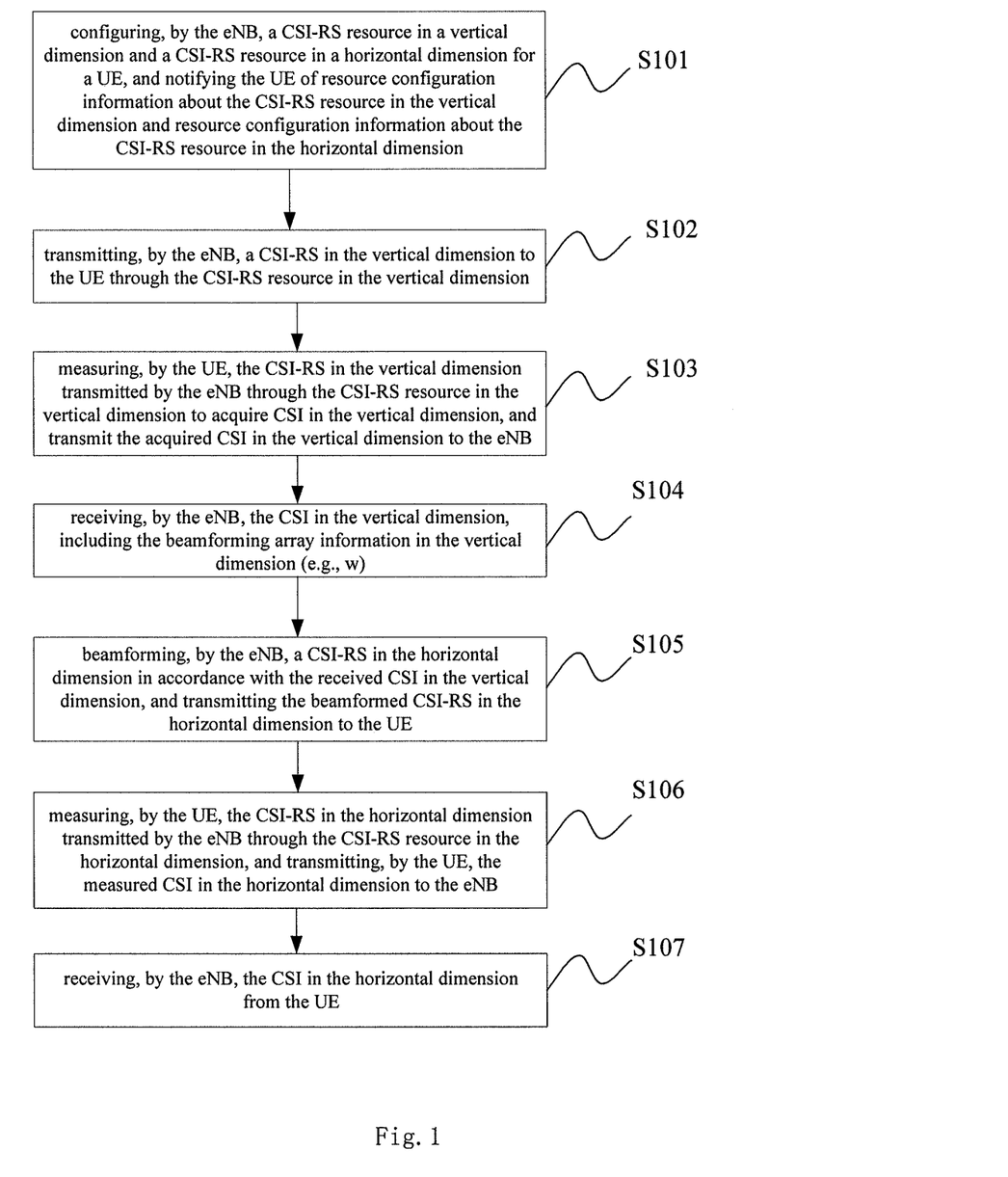
FIG. 1 is a flow chart of a CSI transmission method at both a network side and a UE side in some embodiments of the present disclosure.

Referring to FIG. 1, the present disclosure provides in some embodiments a CSI transmission method, which includes the following steps.

Step S101: configuring, by the eNB, a CSI-RS resource in a vertical dimension and a CSI-RS resource in a horizontal dimension for a UE, and notifying the UE of resource configuration information about the CSI-RS resource in the vertical dimension and resource configuration information about the CSI-RS resource in the horizontal dimension.

The CSI-RS resource refers to time-domain and frequency-domain resources for transmitting a CSI-RS, and the resource configuration information about the CSI-RS resource in the vertical dimension and the resource configuration information about the CSI-RS resource in the horizontal dimension may be notified to the UE through high-layer information. The high-layer information includes a transmission period, an offset value, power and an index of the CSI-RS. For the LTE system, a plurality of available CSI-RS resources may be configured within one subframe. For example, for a two-antenna system, 20 available CSI-RS resources may be configured within one subframe. The CSI-RS index may be used to notify the UE of the CSI-RS resource configured for the UE.

Figure 2:
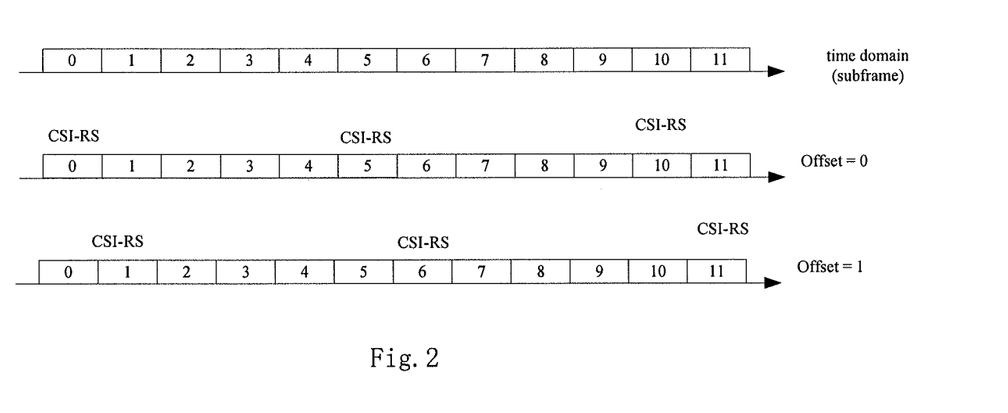
FIG. 2 is a schematic view showing a configuration for a CSI-RS resource in some embodiments of the present disclosure.

Each CSI-RS resource is provided with its own subframe period and offset. Referring to FIG. 2, in the case that the transmission period for each CSI-RS includes 5 subframes, the offset value is used to indicate the subframe of each frame where the CSI-RS is to be transmitted. An offset value of the CSI-RS may be 0, 1, 2, 3 or 4. In the case that the offset value is 0, the CSI-RS may be transmitted at subframe #0 of each frame, and in the case that the offset value is 1, the CSI-RS may be transmitted at subframe #1.

Step S102: transmitting, by the eNB, a CSI-RS in the vertical dimension to the UE through the CSI-RS resource in the vertical dimension.

Step S103: measuring, by the UE, the CSI-RS in the vertical dimension transmitted by the eNB through the CSI-RS resource in the vertical dimension to acquire CSI in the vertical dimension, and transmit the acquired CSI in the vertical dimension to the eNB.

To be specific, in the case that the CSI-RS in the vertical dimension is transmitted via two ports (i.e., the UE determines that the eNB includes two transmitter antennae in the vertical dimension) and the UE includes one receiver antenna, a channel may be a 2×1 matrix. At this time, the UE may measure the channel with respect to each CSI-RS port, so as to acquire the CSI in the vertical dimension.

The CSI in the vertical dimension may be provided in various forms.

(1) The CSI in the vertical dimension may merely include PMI information, so as to reflect an optimal beamforming matrix in the vertical dimension that has been measured by the UE.

(2) The CSI in the vertical dimension may further include a fixed RI corresponding to the PMI information. The RI information is used to reflect the number of code streams corresponding to the PMI information.

The RI information may be appointed by the network side and the UE side in advance, and at this time, it is unnecessary for the UE to report the RI information. Alternatively, the RI information may also be provided through a codebook subset restriction. In the case that there are 16 precoders in a codebook and there is no codebook subset restriction, the UE may report any one of the 16 precoders (in accordance with a measurement result). However, in the case that the UE can merely report one of the former 8 precoders in accordance with the codebook subset restriction, the UE needs to select a precoder to be reported from a subset of the codebook subset restriction (e.g., the 8 precoders).

For example, in the case that RI=1, the UE may merely transmit the PMI information about an antenna array 1 (rank-1), so as to notify the eNB to perform a rank-1 beamforming operation in the vertical dimension. Considering a relatively narrow space between the 3D MIMO antenna arrays in the vertical dimension, it is possible to acquire most of system gains through the beamforming operation in the vertical dimension on the basis of the rank-1 PMI information.

(3) Further, the UE may further transmit Channel Quality Indicator (CQI) information in the vertical dimension acquired on the basis of the PMI information in the vertical dimension to the network side device. Final 3D MIMO CQI information may be acquired in accordance with the CQI information in the vertical dimension and CQI information in the horizontal dimension. However, at this time, the eNB needs to further process the CQI information in the vertical dimension and the CQI Information in the horizontal dimension. In the case that the CQI information in the vertical dimension is CQI 1 and the CQI information in the horizontal dimension is CQI 2, the eNB may assume that the CQI acquired after the 3D MIMO beamforming operation is CQI 1×CQI 2. This is merely a possible scheme, and another other schemes may also be applied, which however may result in a complex structure of the eNB. Hence, as a simple way, the UE may merely transmit the PMI information to the network side device.

It should be appreciated that, under some special circumstances (e.g., in a TDD system), an uplink channel is equivalent to a downlink channel. Depending on this feature, the eNB may measure the uplink channel so as to acquire the downlink beamforming array information in the vertical dimension. To be specific, the UE may transmit a channel measurement signal (e.g., Synchronous Reference Signal (SRS)) to the eNB, and then the eNB may measure the uplink channel. Under a circumstance where reciprocity exists for the uplink and downlink channels (e.g., in the TDD system), it may be assumed that the uplink channel is identical to the downlink channel. At this time, it is unnecessary for the eNB to acquire the beamforming array information in the vertical dimension from the UE, i.e., it is unnecessary for the eNB to configure the CSI-RS resource in the vertical dimension for the UE.

Step S104: receiving, by the eNB, the CSI in the vertical dimension, including the beamforming array information in the vertical dimension (e.g., w).

Step S105: beamforming, by the eNB, a CSI-RS in the horizontal dimension in accordance with the received CSI in the vertical dimension (e.g., W), and transmitting the beamformed CSI-RS in the horizontal dimension to the UE.

Figure 3:
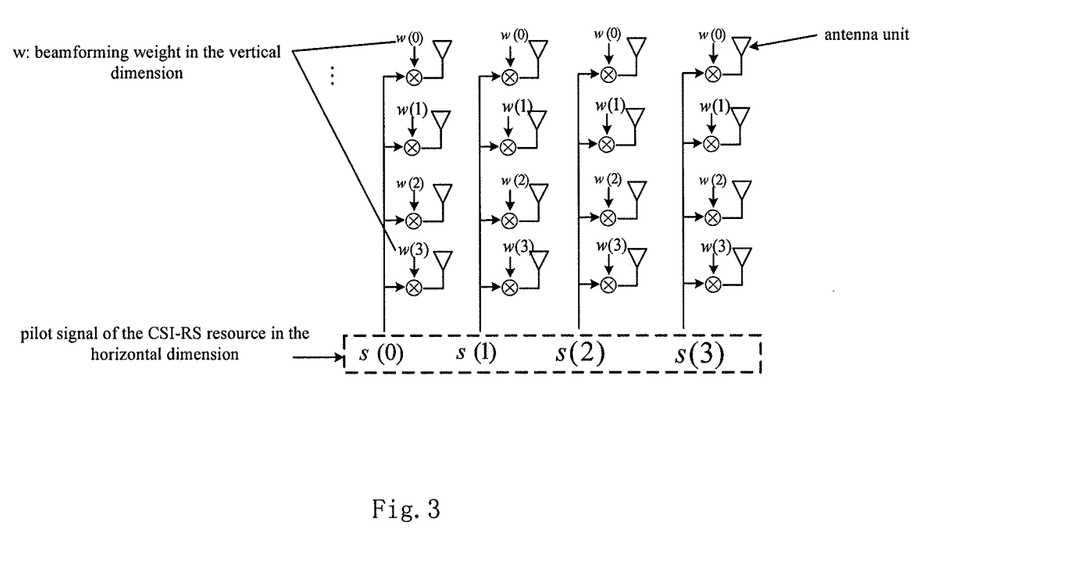
FIG. 3 is a schematic view showing a beamforming in some embodiments of the present disclosure.

The eNB may beamform the CSI-RS in the horizontal dimension in accordance with the received CSI in the vertical dimension, as shown in FIG. 3. There are 16 antennae arranged in four groups in the vertical direction, with four antennae in each group. The antennae in each group are configured to transmit a pilot signal for one port of the CSI-RS in the horizontal dimension. A pilot signal s (i) for an $i^{th}$ port may be weighted by a beamforming weight vector $w=[w(0)\ w(1)\ w(2)\ w(3)]^T$ and then transmitted by the $i^{th}$ group of antennae, i.e., the antennae in an $i^{th}$ column. Here, w represents a beamforming matrix in the vertical dimension, and it may be acquired by the eNB in accordance with the CSI in the vertical dimension. W(0), W(1), W(2) and W(3) are each a scalar, and each of them represents a weighting coefficient. To be specific, there are four antennae in each column, and the weighting coefficients for the four antennae are represented by W(0), W(1), W(2) and W(3) respectively. W(i) represents a weighting coefficient for an $i^{th}$ antenna in each column, and $0<=i<=3$. W(0), W(1), W(2) and W(3) may be of different values. In addition, the weighting coefficients of the antennae in different columns may be identical to each other, i.e., the weight vector W corresponding to the antennae in different columns may be [W(0), W(1), W(2), W(3)]. W is a 4×1 vector, i.e., the weight vector W for the antennae in each column is a 4×1 vector [W(0), W(1), W(2), W(3)]. The antennae in each column may correspond to this vector, so the vectors corresponding to the antennae in each column may be identical. In the case that the UE transmits the PMI information on the CSI-RS resource in the vertical dimension, the PMI information may be acquired from a corresponding codebook (a four-antenna codebook). The PMI information corresponds to the four antennae in the vertical dimension. The eNB may determine the beamforming matrix w in the vertical dimension from the corresponding codebook in accordance with the PMI information.

After the beamforming operation using the weight vector w, the CSI-RSs in the horizontal dimension transmitted by the eNB to the UE in Step S105 may be S(0), S(1), S(2) and S(3), as shown in FIG. 3.

Step S106: measuring, by the UE, the CSI-RS in the horizontal dimension transmitted by the eNB through the CSI-RS resource in the horizontal dimension, and transmitting, by the UE, the measured CSI in the horizontal dimension to the eNB.

Step S107: receiving, by the eNB, the CSI in the horizontal dimension from the UE.

In Step S106, the CSI in the horizontal dimension may be transmitted to the eNB using the method adopted in a conventional one-dimensional antenna system (e.g., an LTE Rel.12 system), without any modification. The UE may measure the CSI-RS in the horizontal dimension which has been beamformed in the vertical dimension, so the obtained CSI is just the final, overall 3D MIMO CSI. The eNB may directly use the final, overall CSI to perform link adaption. After the CSI-RS in the horizontal dimension has been measured, the UE may transmit the PMI information and the CQI information in the horizontal dimension to the eNB. The CQI information refers to the channel quality acquired after the CSI-RS in the horizontal dimension has been beamformed with the PMI information in the horizontal dimension. However, the CSI-RS in the horizontal dimension has been beamformed by the eNB with the PMI information in the vertical dimension, so the CQI information in the horizontal dimension from the UE has just been beamformed with the PMI information in both the horizontal dimension and the vertical dimension. At this time, it is unnecessary for the eNB to perform any operation, and it is able to effectively reduce the complexity of the link adaption.

Figure 4:
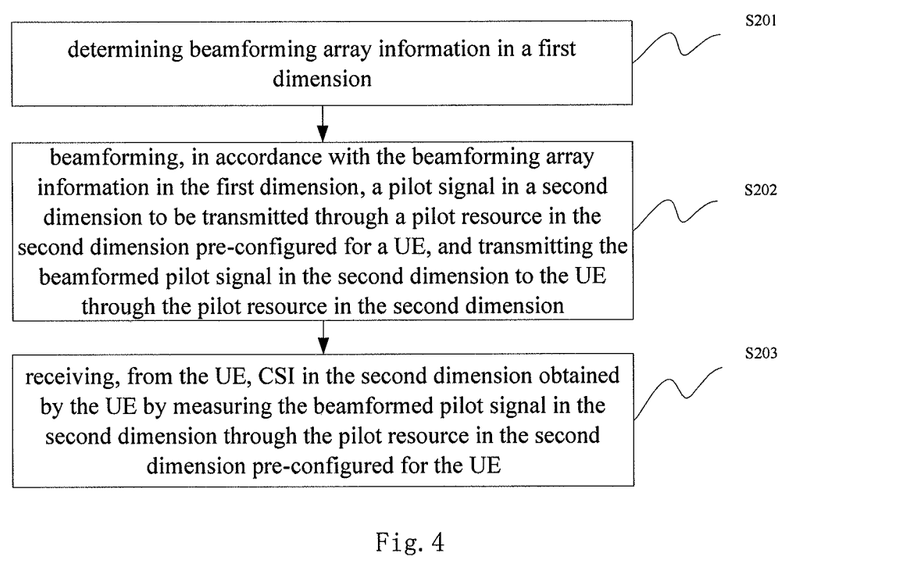
FIG. 4 is a flow chart of a CSI acquisition method at a network side in some embodiments of the present disclosure.

Referring to FIG. 4, the present disclosure provides in some embodiments a CSI acquisition method at a network side, including: Step S201 of determining beamforming array information in a first dimension; Step S202 of beamforming, in accordance with the beamforming array information in the first dimension, a pilot signal in a second dimension to be transmitted through a pilot resource in the second dimension pre-configured for a UE, and transmitting the beamformed pilot signal in the second dimension to the UE through the pilot resource in the second dimension; and Step S203 of receiving, from the UE, CSI in the second dimension obtained by the UE by measuring the beamformed pilot signal in the second dimension through the pilot resource in the second dimension pre-configured for the UE.

According to the CSI acquisition method in the embodiments of the present disclosure, the pilot signal in the second dimension, which needs to be transmitted through the pilot resource in the second dimension pre-configured for the UE, may be beamformed in accordance with the beamforming array information in the first dimension, and then the beamformed pilot signal in the second dimension may be transmitted to the UE through the pilot resource in the second dimension, so that the UE may measure the pilot signal in the second dimension beamformed in accordance with the beamforming array information in the first dimension and the obtained CSI is just overall CSI for a final 3D MIMO antenna array. In this way, it is unnecessary to configure excessive pilot resources for the UE, and it is unnecessary for the UE to measure and report the excessive pilot resources, thereby it is able to reduce the difficulty in processing the CSI progresses at a UE side. In addition, the network side device may directly schedule a link in accordance with the CSI in one dimension reported by the UE, rather than the CSI in two dimensions, so it is able to facilitate the CSI feedback and acquisition, and save the resources.

Optionally, the step of determining the beamforming array information in the first dimension includes: pre-configuring a pilot resource in the first dimension for the UE and notifying the UE of the pilot resource in the first dimension; transmitting a pilot signal in the first dimension to the UE through the pilot resource in the first dimension; and receiving, from the UE, CSI in the first dimension obtained by the UE by measuring the pilot signal in the first dimension through the pilot resource in the first dimension, and taking the CSI in the first dimension as the beamforming array information in the first dimension.

Optionally, the CSI in the first dimension includes Precoding Matrix Indicator (PMI) information.

Optionally, the CSI in the first dimension further includes Rank Indicator (RI) information corresponding to the PMI information.

Optionally, the CSI in the first dimension further includes CQI information obtained by the UE in accordance with the PMI information.

Optionally, the step of beamforming the pilot signal in the second dimension in accordance with the beamforming array information in the first dimension includes: beamforming the pilot signal in the second dimension through the CSI in the first dimension which is measured by the UE through the pilot resource in the first dimension and transmitted from the UE; or processing the CSI in the first dimension and beamforming the pilot signal in the second dimension in accordance with the processed CSI in the first dimension.

Optionally, the step of determining the beamforming array information in the first dimension includes measuring an uplink channel to determine the beamforming array information in the first dimension.

Optionally, the first dimension is perpendicular to the second dimension.

Optionally, the first dimension is a vertical dimension, and the second dimension is a horizontal dimension.

Optionally, the pilot resource is a CSI-RS resource or a CRS resource.

Figure 5:
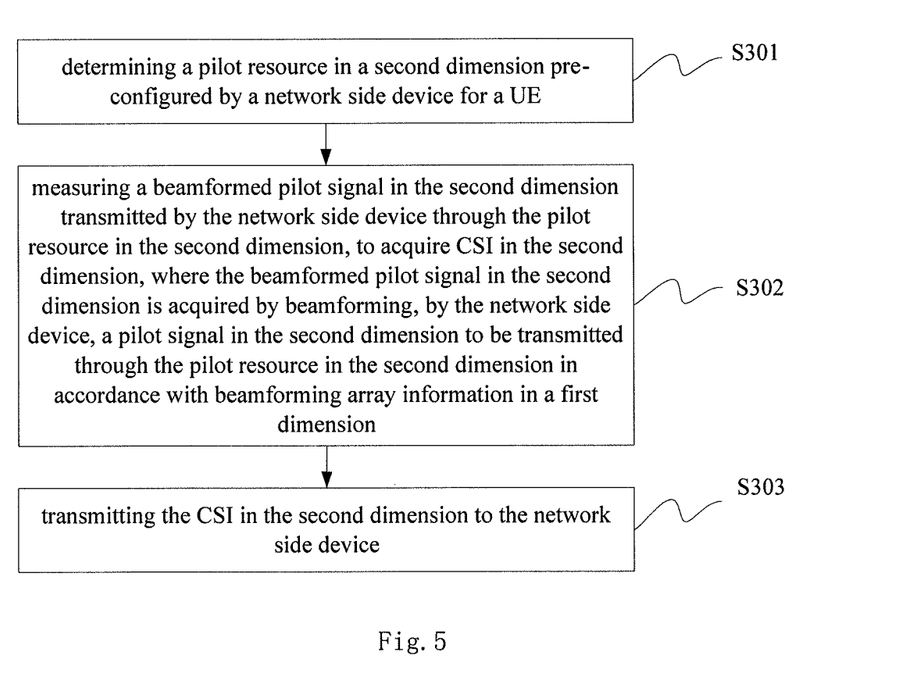
FIG. 5 is a flow chart of a CSI feedback method at a UE side in some embodiments of the present disclosure.

Referring to FIG. 5, the present disclosure further provides in some embodiments a CSI feedback method at a UE side, including: Step S301 of determining a pilot resource in a second dimension pre-configured by a network side device for a UE; Step S302 of measuring a beamformed pilot signal in the second dimension transmitted by the network side device through the pilot resource in the second dimension, to acquire CSI in the second dimension, where the beamformed pilot signal in the second dimension is acquired by beamforming, by the network side device, a pilot signal in the second dimension to be transmitted through the pilot resource in the second dimension in accordance with beamforming array information in a first dimension; and Step S303 of transmitting the CSI in the second dimension to the network side device.

According to the CSI feedback method in the embodiments of the present disclosure, the network side device may beamform the pilot signal in the second dimension, which needs to be transmitted through the pilot resource in the second dimension pre-configured for the UE, in accordance with the beamforming array information in the first dimension, and then transmit the beamformed pilot signal in the second dimension to the UE through the pilot resource in the second dimension, so that the UE may measure the pilot signal in the second dimension beamformed in accordance with the beamforming array information in the first dimension and the obtained CSI is just overall CSI for a final 3D MIMO antenna array. In this way, it is unnecessary for the UE to measure and report the excessive pilot resources, thereby it is able to reduce the difficulty in processing the CSI progresses at a UE side, facilitate the CSI feedback and acquisition, and save the resources.

Optionally, the CSI feedback method further includes: determining, by the UE, a pilot resource in the first dimension pre-configured by the network side device for the UE: measuring a pilot signal in the first dimension transmitted through the pilot resource in the first dimension, so as to acquire CSI in the first dimension; and transmitting, by the UE, the CSI in the first dimension to the network side device.

Optionally, the CSI in the first dimension includes PMI information.

Optionally, the CSI in the first dimension further includes RI information corresponding to PMI information.

Optionally, the CSI in the first dimension further includes CQI information obtained by the UE in accordance with the PMI information.

Figure 6:
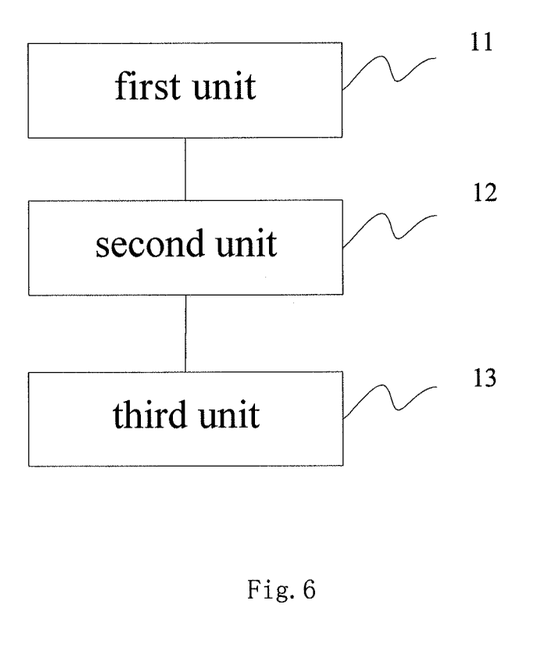
FIG. 6 is a schematic view showing a CSI acquisition device at the network side in some embodiments of the present disclosure.

Referring to FIG. 6, the present disclosure further provides in some embodiments a CSI acquisition device at a network side, including: a first unit 11 configured to determine beamforming array information in a first dimension; a second unit 12 configured to beamform, in accordance with the beamforming array information in the first dimension, a pilot signal in a second dimension to be transmitted through a pilot resource in the second dimension pre-configured for a UE, and transmit the beamformed pilot signal in the second dimension to a UE through a pilot resource in the second dimension; and a third unit 13 configured to receive from the UE CSI in the second dimension obtained by the UE by measuring the beamformed pilot signal in the second dimension on the pilot resource in the second dimension pre-configured for the UE.

Optionally, the CSI feedback device further includes a fourth unit configured to pre-configure a pilot resource in the first dimension for the UE and notify the UE of the pilot resource in the first dimension, and transmit a pilot signal in the first dimension to the UE through the pilot resource in the first dimension. The first unit is further configured to receive, from the UE, CSI in the first dimension obtained by the UE by measuring the pilot signal in the first dimension through the pilot resource in the first dimension, and take the CSI in the first dimension as the beamforming array information in the first dimension.

Optionally, the CSI in the first dimension includes PMI information.

Optionally, the CSI in the first dimension further includes RI information corresponding to the PMI information.

Optionally, the CSI in the first dimension further includes CQI information obtained by the UE in accordance with the PMI information.

Optionally, in the case that the second unit beamforms the pilot signal in the second dimension in accordance with the beamforming array information in the first dimension, the second unit is further configured to beamform the pilot signal in the second dimension directly through the CSI in the first dimension which is measured by the UE through the pilot resource in the first dimension and transmitted from the UE; or process the CSI in the first dimension and beamform the pilot signal in the second dimension in accordance with the processed CSI in the first dimension.

Optionally, the first unit is further configured to measure an uplink channel to determine the beamforming array information in the first dimension.

Figure 7:
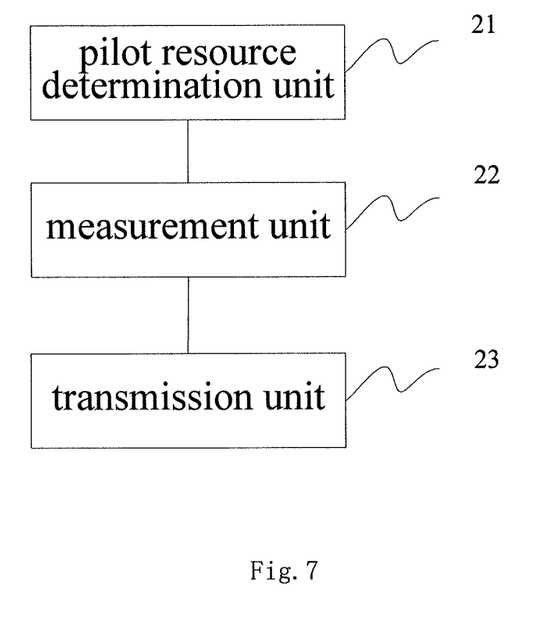
FIG. 7 is a schematic view showing a CSI feedback device at the UE side in some embodiments of the present disclosure.

Referring to FIG. 7, the present disclosure further provides in some embodiments a CSI feedback device at a UE side, including: a pilot resource determination unit 21 configured to determine a pilot resource in a second dimension pre-configured by a network side device for a UE; a measurement unit 22 configured to measure a beamformed pilot signal in the second dimension transmitted by the network side device through the pilot resource in the second dimension, to acquire CSI in the second dimension, where the beamformed pilot signal in the second dimension being a pilot signal acquired by beamforming, by the network side device, a pilot signal in the second dimension to be transmitted through the pilot resource in the second dimension in accordance with beamforming array information in a first dimension; and a transmission unit 23 configured to transmit the CSI in the second dimension to the network side device.

Optionally, the pilot resource determination unit 21 is further configured to determine a pilot resource in the first dimension pre-configured by the network side device for the UE. The measurement unit 22 is further configured to measure a pilot signal in the first dimension transmitted through the pilot resource in the first dimension, so as to acquire CSI in the first dimension. The transmission unit 23 is further configured to transmit the CSI in the first dimension to the network side device.

Figure 8:
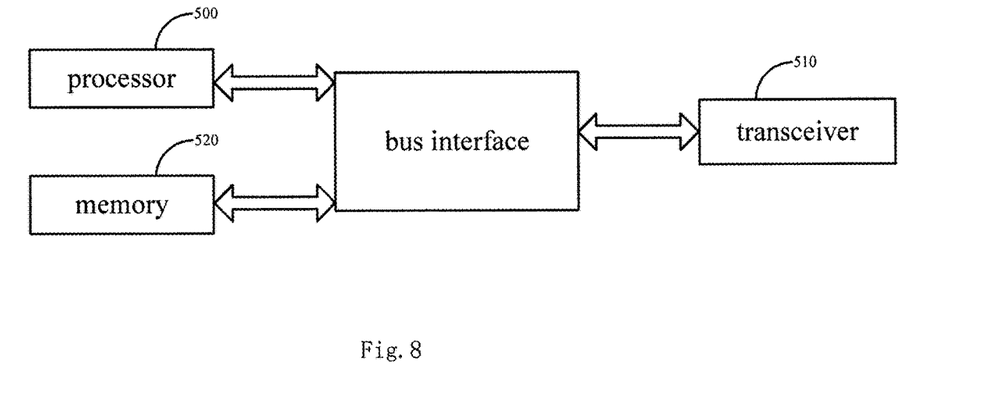
FIG. 8 is a schematic view showing a base station for acquiring CSI in some embodiments of the present disclosure.

Referring to FIG. 8, the present disclosure further provides in some embodiments a base station for acquiring CSI, including a processor 500, a transceiver 510 and a memory 520. The processor 500 is configured to read programs stored in the memory 520, so as to: determine beamforming array information in a first dimension; beamform, in accordance with the beamforming array information in the first dimension, a pilot signal in a second dimension to be transmitted through a pilot resource in the second dimension pre-configured for a UE, and transmit, through the transceiver 510, the beamformed pilot signal in the second dimension to the UE through the pilot resource in the second dimension; and receive, through the transceiver 510, from the UE CSI in the second dimension obtained by the UE by measuring the pilot signal in the second dimension through the pilot resource in the second dimension pre-configured for the UE. The transceiver 510 is configured to receive and transmit data under the control of the processor 500.

The processor 500 is further configured to pre-configure a pilot resource in the first dimension for the UE and notify, through the transceiver 510, the UE of the pilot resource in the first dimension, and transmit, through the transceiver 510, a pilot signal in the first dimension to the UE through the pilot resource in the first dimension.

In the case of determining the beamforming array information in the first dimension, the processor 500 is further configured to receive, through the transceiver 510, from the UE, CSI in the first dimension obtained by measuring the pilot signal in the first dimension through the pilot resource in the first dimension, and take the CSI in the first dimension as the beamforming array information in the first dimension.

In the case of beamforming the pilot signal in the second dimension in accordance with the beamforming array information in the first dimension, the processor 500 is further configured to: beamform the pilot signal in the second dimension directly through the CSI in the first dimension which is measured by the UE through the pilot resource in the first dimension and transmitted from the UE; or process the CSI in the first dimension and beamform the pilot signal in the second dimension in accordance with the processed CSI in the first dimension.

Optionally, in the case of determining the beamforming array information in the first dimension, the processor 500 is further configured to measure an uplink channel to determine the beamform array information in the first dimension.

In FIG. 5, a bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. Bus interfaces are provided, and the transceiver 510 may consist of a plurality of elements, i.e., a transmitter and a receiver for communication with any other devices over a transmission medium. The processor 500 may take charge of managing the bus architecture as well general processings. The memory 520 may store data desired for the operation of the processor 500.

Figure 9:
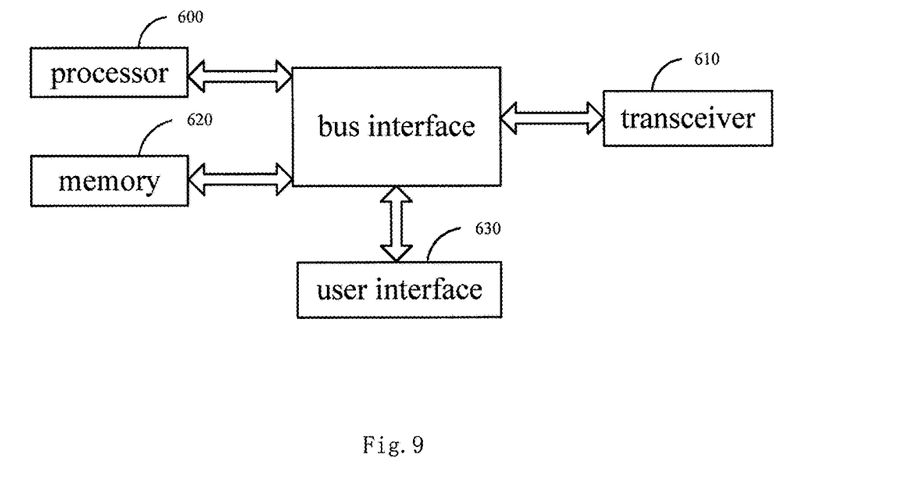
FIG. 9 is a schematic view showing a UE for acquiring CSI in some embodiments of the present disclosure.

Referring to FIG. 9, the present disclosure further provides in some embodiments a UE for the CSI feedback at a UE side, including a processor 600, a transceiver 610 and a memory 620. The processor 600 is configured to read programs stored in the memory 620, so as to: determine a pilot resource in a second dimension pre-configured by a network side device for the UE; measure a beamformed pilot signal in the second dimension transmitted by the network side device through the pilot resource in the second dimension, to acquire CSI in the second dimension, where the beamformed pilot signal in the second dimension is acquired by beamforming, by the network side device, a pilot signal in the second dimension to be transmitted through the pilot resource in the second dimension in accordance with beamforming array information in a first dimension; and transmit, through the transceiver 610, the CSI in the second dimension to the network side device. The transceiver 610 is configured to receive and transmit data under the control of the processor 600.

Optionally, the processor 600 is further configured to: determine, a pilot resource in the first dimension pre-configured by the network side device for the UE: measure a pilot signal in the first dimension transmitted through the pilot resource in the first dimension, so as to acquire CSI in the first dimension; and transmit, through the transceiver 610, the CSI in the first dimension to the network side device.

In FIG. 6, a bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. Bus interfaces are provided, and the transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick.

The processor 600 may take charge of managing the bus architecture as well as general processings. The memory 620 may store data desired for the operation of the processor 600.

In a word, according to the embodiments of the present disclosure, the UE may measure the CSI-RS in the horizontal dimension and transmit the CSI in the horizontal dimension to the network side device. The CSI is the overall CSI acquired after the 3D MIMO beamforming operation, and it may be directly used for scheduling the link, i.e., it is unnecessary for the eNB to further process the CSI. Hence, it is able to reduce the CSI-RS overhead as well as the CSI feedback and measurement overhead. In addition, due to the very low requirement on the processing, it is able for the eNB to directly use the CSI in the horizontal dimension to perform the link adaption without further processing the CSI in the vertical dimension and the CSI in the horizontal dimension, so it is able to reduce the complexity of the eNB.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A Channel State Information (CSI) acquisition method, comprising:
   pre-configuring a pilot resource in the first dimension for the UE and notifying the UE of the pilot resource in the first dimension;
   transmitting a pilot signal in the first dimension to the UE through the pilot resource in the first dimension;
   receiving, from the UE, CSI in the first dimension obtained by the UE by measuring the pilot signal in the first dimension through the pilot resource in the first dimension, and taking the CSI in the first dimension as the beamforming array information in the first dimension;
   beamforming a pilot signal in a second dimension in accordance with the CSI in the first dimension, and transmitting the beamformed pilot signal in the second dimension to a User Equipment (UE) through a pilot resource in the second dimension; and
   receiving, from the UE, CSI in the second dimension obtained by the UE by measuring the beamformed pilot signal in the second dimension, to perform a link scheduling by only using the CSI in the second dimension;
   wherein the CSI in the first dimension comprises Precoding Matrix Indicator (PMI) information, and Rank Indicator (RI) information corresponding to the PMI information is appointed with the UE in advance.

2. The CSI acquisition method according to claim 1, wherein the CSI in the first dimension further comprises Channel Quality Indicator (CQI) information obtained by the UE in accordance with the PMI information.

3. The CSI acquisition method according to claim 1, wherein the first dimension is perpendicular to the second dimension.

4. The CSI acquisition method according to claim 1, wherein the first dimension is a vertical dimension, and the second dimension is a horizontal dimension.

5. The CSI acquisition method according to claim 1, wherein the pilot resource is a Channel State Information Reference Signal (CSI-RS) resource or a Common Reference Signal (CRS) resource.

6. The CSI acquisition method according to claim 1, wherein the beamforming the pilot signal in the second dimension in accordance with the beamforming array information in the first dimension comprises:
   beamforming the pilot signal in the second dimension through the CSI in the first dimension which is measured by the UE through the pilot resource in the first dimension and transmitted from the UE; or
   processing the CSI in the first dimension and beamforming the pilot signal in the second dimension in accordance with the processed CSI in the first dimension.

7. A Channel State Information (CSI) feedback method, comprising:
   determining a pilot resource in a second dimension pre-configured by a network side device;
   measuring a beamformed pilot signal in the second dimension transmitted by the network side device through the pilot resource in the second dimension, to acquire CSI in the second dimension; and
   transmitting the CSI in the second dimension to the network side device, to enable the network side device to perform a link scheduling, wherein the link scheduling is performed by only using the CSI in the second dimension;
   wherein the method further comprises:
   determining, by a User Equipment (UE), a pilot resource in the first dimension pre-configured by the network side device for the UE:
   measuring a pilot signal in the first dimension transmitted through the pilot resource in the first dimension, to acquire CSI in the first dimension; and
   transmitting, by the UE, the CSI in the first dimension to the network side device;
   wherein the CSI in the first dimension comprises Precoding Matrix Indicator (PMI) information, and Rank Indicator (RI) information corresponding to the PMI information is appointed by the UE with the network side device in advance.

8. The CSI feedback method according to claim 7, wherein the CSI in the first dimension further comprises Channel Quality Indicator (CQI) information obtained by the UE in accordance with the PMI information.

9. A Channel State Information (CSI) feedback device, comprising:
   a processor;
   a memory connected to the processor via a bus interface and configured to store therein programs and data for the operation of the processor; and
   a transceiver configured to communicate with any other devices over a transmission medium,
   wherein in the case that the programs and data stored in the memory are called and executed by the processor, the processor is configured to:
      determine a pilot resource in a second dimension pre-configured by a network side device for the CSI feedback device;
      measure a beamformed pilot signal in the second dimension transmitted by the network side device through the pilot resource in the second dimension, to acquire Channel State information (CSI) in the second dimension; and
   transmit the CSI in the second dimension to the network side device, to enable the network side device to perform a link scheduling, wherein the link scheduling is performed by only using the CSI in the second dimension;
   wherein the processor is further configured to determine a pilot resource in the first dimension pre-configured by the network side device for the CSI feedback device;
   the processor is further configured to measure a pilot signal in the first dimension transmitted through the pilot resource in the first dimension, to acquire CSI in the first dimension; and
   the transceiver is further configured to transmit the CSI in the first dimension to the network side device;
   wherein the CSI in the first dimension comprises Precoding Matrix Indicator (PMI) information, and Rank Indicator (RI) information corresponding to the PMI information is appointed with the network side device in advance.

* * * * *